United States Patent [19]
Heimberger

[11] 3,885,273
[45] May 27, 1975

[54] SLIDE FASTENER
[75] Inventor: Helmut Heimberger, Grenzach, Germany
[73] Assignee: Opti-Holding AG, Glarus, Switzerland
[22] Filed: Jan. 25, 1974
[21] Appl. No.: 436,630

[30] Foreign Application Priority Data
Jan. 26, 1973 Germany............................ 2303797

[52] U.S. Cl. .................. 24/205.13 D; 24/205.13 R
[51] Int. Cl. ............................................ A44b 19/14
[58] Field of Search.... 24/205.13 D, 205.12, 90 HA

[56] References Cited
UNITED STATES PATENTS
| | | | |
|---|---|---|---|
| 2,066,060 | 12/1936 | Sipe .............................. | 24/205.13 D |
| 2,252,305 | 8/1941 | Puschner ...................... | 24/205.13 D |
| 3,490,098 | 1/1970 | Frohlich....................... | 24/205.13 D |
| 3,736,628 | 6/1973 | Hansen ........................ | 24/205.13 D |
| 3,772,743 | 11/1973 | Hansen ........................ | 24/205.13 D |

FOREIGN PATENTS OR APPLICATIONS
| | | | |
|---|---|---|---|
| 1,214,924 | 4/1960 | France........................... | 24/205.13 D |
| 246,542 | 8/1963 | Australia....................... | 24/205.13 D |

Primary Examiner—Bernard A. Gelak
Attorney, Agent, or Firm—Karl F. Ross; Herbert Dubno

[57] ABSTRACT

A slide-fastener stringer has a continuous extruded coupling element of thermoplastic synthetic resin with closely spaced coupling heads projecting beyond the edge of a support tape to which the coupling element is fused. The ligaments connecting the coupling heads and/or the shanks thereof are formed with humps which engage the support tape and are thermally fused (welded) thereto.

8 Claims, 5 Drawing Figures

SLIDE FASTENER

CROSS-REFERENCE TO RELATED APPLICATION

The present application is related to my copending concurrently filed application Ser. No. 436,629 filed Jan. 25, 1974 entitled METHOD OF AND APPARATUS FOR MAKING SLIDE-FASTENER STRINGERS.

1. Field of the Invention

My present invention relates to a slide fastener, slide-fastener half or slide-fastener stringer comprising at least one continuous coupling element extruded from a thermoplastic synthetic resin material and secured along an edge of a support tape. More particularly, the invention relates to improvements in the attachment of such a coupling element to a support tape.

2. Background of the Invention

A slide-fastener stringer may comprise a pair of slide-fastener halves each of which includes a support tape along an edge of which a coupling element or shank is provided. The coupling element may be of the continuous type, i.e., may have a multiplicity of relatively closely spaced coupling heads which project beyond the edge of the support tape and are connected together by ligatures, webs or bights unitarily formed with the coupling heads in an extrusion process.

The coupling heads of the two slide-fastener halves interdigitate and may be provided with formations preventing lateral or transverse separation of the two coupling elements when a slider is moved along the coupling elements in one direction. When the slider is moved in the opposite direction, a wedge or like formation slides the two coupling elements apart to bring about separation. A slide-fastener stringer may be of the separable type in which each of the slide-fastener halves is provided with a respective end-stop member and the two members are brought together and the coupling elements aligned by fitting a male end-stop member into a female end-stop member and the slider. Alternatively, the slide-fastener stringer may be of the nonseparable type in which one or both ends of the two slide-fastener halves are held together by a common end-stop member.

While various techniques have been proposed heretofore for securing the coupling elements to the support tapes, they may generally be grouped in three categories. In a first category is the attachment of the coupling element by loops of thread, or by stitching the coupling element to the support tape with a row of chain or lock stitches or the like, by fitting the coupling heads through openings in the tape, or by weaving or knitting the coupling element into the tape. A second technique which has been practiced heretofore is the clamping of the individual coupling heads to the edge of the tape by crimping or like techniques.

Finally, it has been proposed heretofore to provide continuous coupling elements with rows of closely spaced heads as previously described which are thermally welded or adhesively bonded to the support tape or are anchored thereto by rivets, studs or like widely-spaced pin-like formations inserted into or formed on the extruded coupling element. It is to an improvement of this general type of coupling and slide fastener that the present invention is applicable.

With extruded coupling elements having pins, studs or rivet-like formations adapted to penetrate the tape and thereafter provided by thermal fusion with a head along the opposite side of the tape from that at which the pin, stud or rivet is anchored to the coupling element, substantial problems exist.

Firstly, it is difficult to provide such studs in closely spaced relationship by extrusion processes because of the discrete character of each stud. Secondly, when the stud is anchored to the tape by forming a head thereon, the anchorage to the tape may be insufficiently firm. Thirdly, the latter type of attachment provides more or less point connection of the coupling element with the tape and creates substantial stress upon the region in which the stud penetrates the tape, especially where considerable transverse force tending to separate the coupling elements is applied. Frequently the fabric or synthetic resin material of the tape tears under this stress and results in release of the coupling element over at least a portion of its length.

Generally speaking the use of studs has been found to be impractical for slide fasteners of a high degree of fineness, i.e., very close spacing of the coupling heads, as have recently been developed for garments or the like in which the slide fastener is intended to be unobtrusive. Finally, there is always the danger that the stud, pin or rivet will tear loose from the coupling element and thereby release the connection between it and the tape.

OBJECTS OF THE INVENTION

It is, therefore, the principal object of the present invention to provide a slide fastener in which the coupling element has a secure bond between the coupling member on the one hand and the support tape on the other hand.

It is another object of the invention to provide improved means for securing a coupling element to a support tape such that finer coupling elements can be employed.

Still another object of the invention is to provide a slide-fastener stringer, stringer half or the like in which the coupling element can be more readily produced by extrusion and can be secured to the tape with less danger of separation and without the application of extreme localized stress to the tape.

Yet another object of the invention is to provide a slide fastener which can be made less expensively and with a closer spacing of the coupling heads than prior-art stringers.

SUMMARY OF THE INVENTION

These objects and others which will become apparent hereinafter are attained in a slide fastener or slide-fastener half or stringer half which comprises a textile support tape and a continuous coupling element extruded preferably endlessly in the manner described in the aforementioned copending application, from a thermoplastic synthetic resin and having a multiplicity of closely spaced coupling heads interconnected by connecting webs, ligatures or like members and provided with fastening members overlying the fabric support tape. According to the principles of this invention, the coupling element is formed along surfaces confronting the support tape, by embossing, with a multiplicity of humps upon the surfaces of at least one of these members and preferably both.

In other words, the humps are provided along surfaces of the fastening portions of the coupling element and/or those portions which connect the coupling heads together. The humps are formed by pressing a member into the plastically deformable synthetic resin and result from a swelling out of the material of the synthetic resin. The humps are, moreover, thermally bonded ("welded") by heat and pressure and/or ultrasonically to the support tape.

The invention thus comprises, in a stringer half having a fabric-support tape and a coupling element whose coupling heads are interconnected by connecting members and are provided with fastening members (e.g. shanks), a surface array of humps formed by embossing of the thermoplastic material of the coupling element and serving as welding pumps which can be thermally bonded to (and into) the fabric material of the tape.

In one embodiment of the invention, the coupling element is generally planar, i.e., the coupling heads lie in a plane parallel to the surface of the tape and have connecting members and fastening members or portions juxtaposed with one side thereof. In this case, the welding pumps are provided edgewise on the fastening portions and advantageously also on the connecting portions by embossment, coining or like techniques involving displacement of the plastically flowable material of the coupling element, the latter being thereupon thermally bonded to the support tape by these humps.

In the embodiment of the invention in which the coupling members are generally of U-section and have heads formed as the bights of the respective U so that the shanks of each coupling member straddle the edge of the support tape and lie along opposite surfaces thereof, the shanks form the connecting members and I prefer to provide the welding humps on the inner faces of the shanks of the U. The shanks can thus be pressed together to engage formfittingly and bond to the fabric of the support tape interposed between them. The latter embodiment has been found to be especially advantageous for extremely high transverse stresses. When the individual U-shaped coupling members are linked together by ligatures or connecting members, it is frequently desirable to provide the welding humps also on the faces of the ligatures confronting the support tape and to thermally bond these welding humps to the tape.

The inventions is based upon the discovery that a surface array of welding humps can be formed readily by embossment of a surface of the coupling element in an open mold in which the coupling element is continuously extruded simply by forcing a tool into the surface, the material around the tool welling up in the form of these humps. The tool is pressed into the material in the mold cavity which is, consequently, confined so that a plastic displacement of the material occurs which is retained upon cooling and hardening of the thermoplastic or in which a plastic deformation is effected.

According to the invention, the coupling element is continuously extruded in forms which extend endlessly, e.g. are provided on a conveyor, with one face of the form being opened to accommodate the embossing tool. The tool is receivable in the cavity on the side with peripheral clearance so that the material, which cannot flow elsewhere, wells up around the tool to provide an annular array of such humps. The humps have the configuration of undulating bulges of arcuate profile which have been formed to engage the fabric and to penetrate into the latter in a similar annular pattern whereby point stresses and edge stresses are avoided. Furthermore, the embossing operation effects a working of the synthetic resin material which can increase its molecular orientation and strengthen the welded humps. Since the humps have a large cross-section in a plane parallel to the interface at which the coupling element is joined to the tape, the welding pressure, applied perpendicularly to the tape, is distributed over a large area and little specific stress is created.

The welding of the tape to the coupling element and vice versa is effected by the use of heat and pressure and preferably with the aid of ultrasonic tools. The junction between the coupling members and the tape is effected solely at the welding humps since the latter penetrate into the fabric tape. Since the bonding at the humps practically does not increase the stiffness of the coupling elements, they remain substantially as flexible as when extruded and the resulting stringers are particularly advantageous for use in the garment industry.

The formation of the welding humps according to the present invention poses no difficulty even when the coupling element is to be used for a slide fastener with a high degree of fineness since the coupling members thereof can be readily produced in an open continuous mold in the manner previously described and the embossing member can be designed to pass with clearance into the opening of the mold member. The important point, in this regard, is that it is not necessary to impart to the welding hump any particular configuration by a positive shaping means inasmuch as a hump configuration readily develops simply because of the lateral displacement of the material during embossment.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 2:
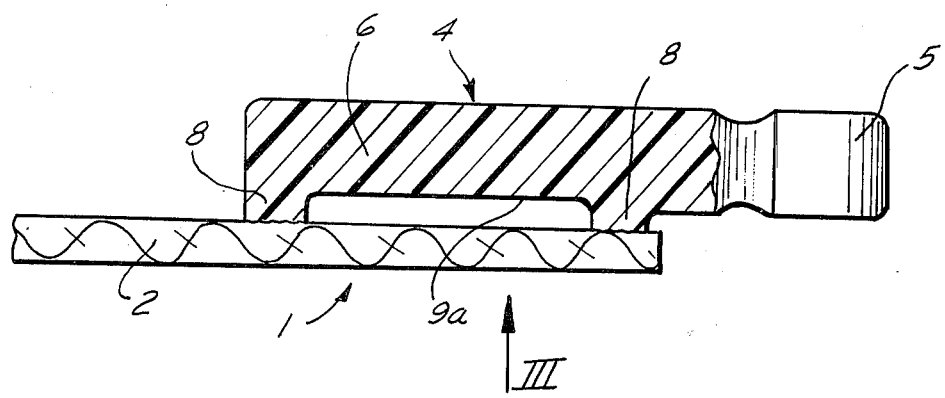
FIG. 2 is a cross section taken along the line II — II of FIG. 1, enlarged to a greater degree and likewise illustrating diagrammatically a portion of a slide-fastener stringer according to the invention.
Figure 1:
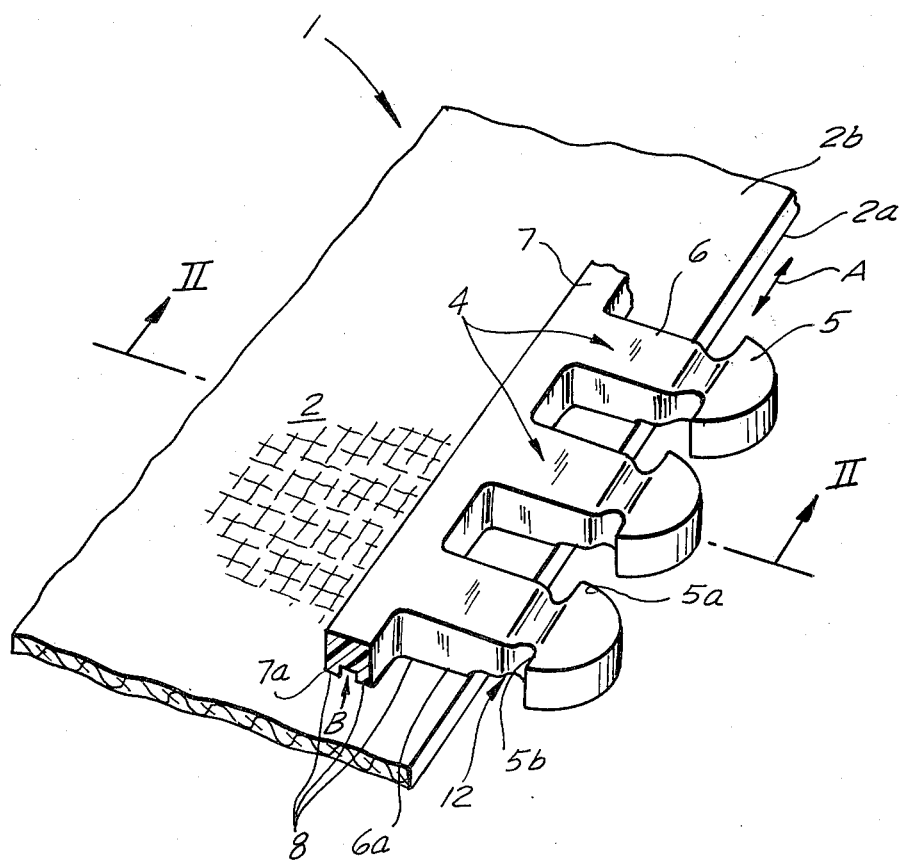
FIG. 1 is a perspective view partly in diagrammatic form, greatly enlarged over the true scale, of a portion of a slide-fastener stringer embodying the invention.
Figure 3:
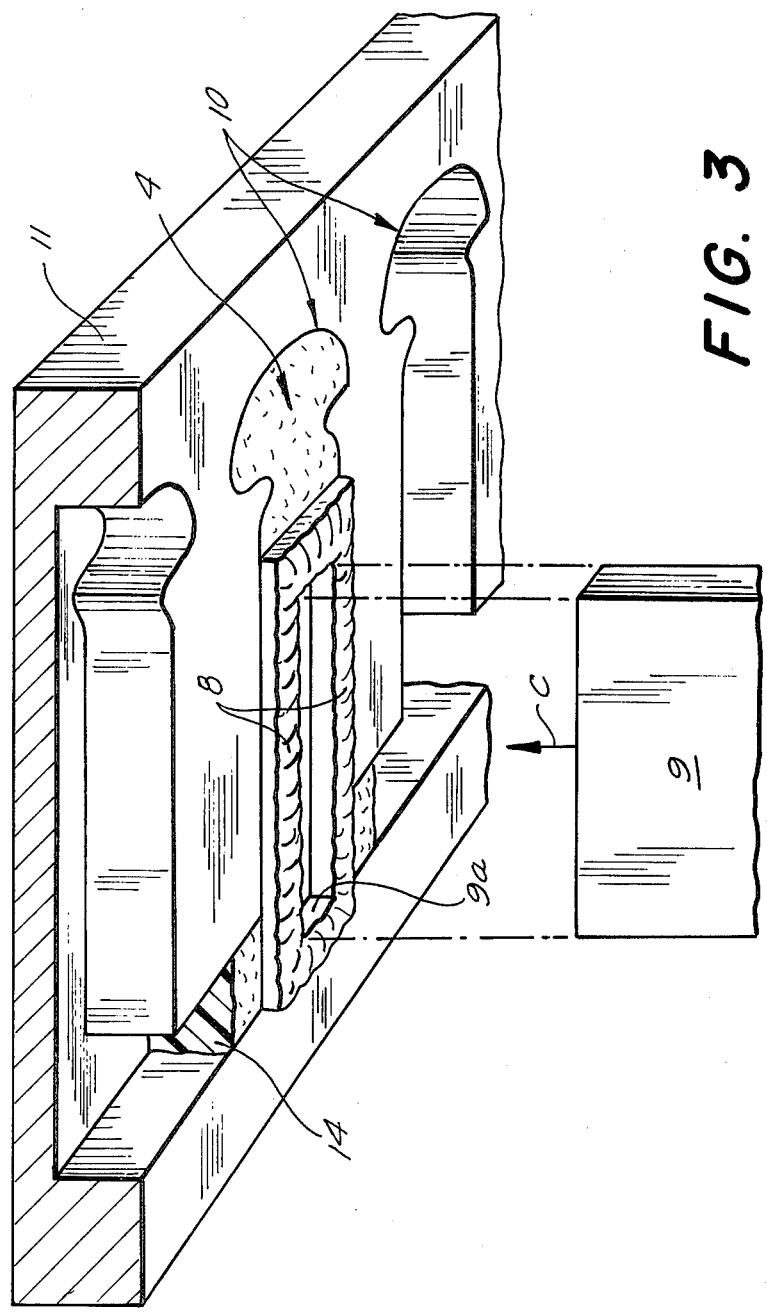
FIG. 3 is a view taken in the direction of arrow III in FIG. 2, showing how a coupling element can be formed according to the invention at least with welding humps over the fastening portion of each coupling member.

In FIGS. 1 through 3 of the drawing, I have shown one stringer half 1 of a slide fastener in which a fabric support tape 2 is provided along an edge 2a with a coupling element 3 of the continuous type having individual coupling members 4 joined together with connecting portions 7 and carrying coupling heads 5.

In this embodiment, a planar coupling element is provided, i.e., the coupling heads 5 lie in a plane parallel to the surface 2b of the tape 2 to which the coupling element is applied. The coupling heads 5 may be circular segmental members whose projections 5a and 5b in the longitudinal direction (arrow A) engage behind the coupling heads of the mating coupling element with which these coupling members interdigitate upon movement of the slider along the coupling elements. In this embodiment, the connecting portions 7 extend parallel to the longitudinal edge 2a of the tape and have undersides 7a which are juxtaposed with the surface 2b of the tape while the shanks 6 connecting the heads 5 of each member with the ligatures 7 are provided with surfaces 6a and juxtaposed with the tape surface 2b.

According to the invention, the surfaces 6a and 7a are formed with surface arrays of humps 8 which are shown in perspective view in FIG. 3 and have been thermally bonded to the tape in FIGS. 1 and 2 and hence are not as readily visible.

As can be seen from FIG. 1, the humps 8 along the surface 7a can be formed by driving an embossing tool into the surface 7a in the direction of arrow B and thereby causing material to flow outwardly.

A tool 9, best seen in FIG. 3, can be driven in the direction of arrow C into the surface 6a of shanks 6 to cause the thermoplastic material of the coupling elements to flow outwardly and thereby form the hump around this tool 9 and the recess 9a formed in the shanks 6 and best seen in FIGS. 2 and 3. The embossment is preferably carried out after the thermoplastic material 14 has been extruded into the recesses 10 forming mold cavities in a mold strip 11. The latter may be endless, i.e., formed as a belt, as described in the aforementioned copending application. The tool 9 and a similar tool for forming the humps in the surface 7a, are preferably forced into the thermoplastic material before it has fully hardened, i.e., while this material is in a plastically deformable but nonfloable state within the mold cavities 10, which, for this purpose, are open to one side (downwardly in FIG. 3).

When the coupling element 3 is thermally bonded to the fabric under heat and pressure and preferably with the aid of an ultrasonic device as described in the latter application, the humps 8 weld to the fabric and are imbedded in part therein, the remainder of the coupling element remaining unbonded. Consequently, the flexibility of the coupling element is not reduced. It should be noted in connection with FIGS. 1 through 3, moreover, that it is preferred that cavities 10 open upwardly, in which case the member 9 presses downwardly.

Figure 5:
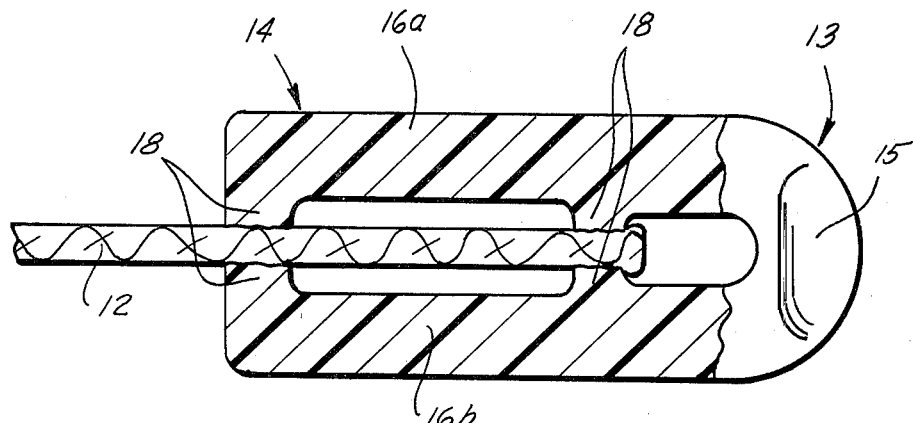
FIG. 5 is a section taken along the line V — V of FIG. 4.
Figure 4:
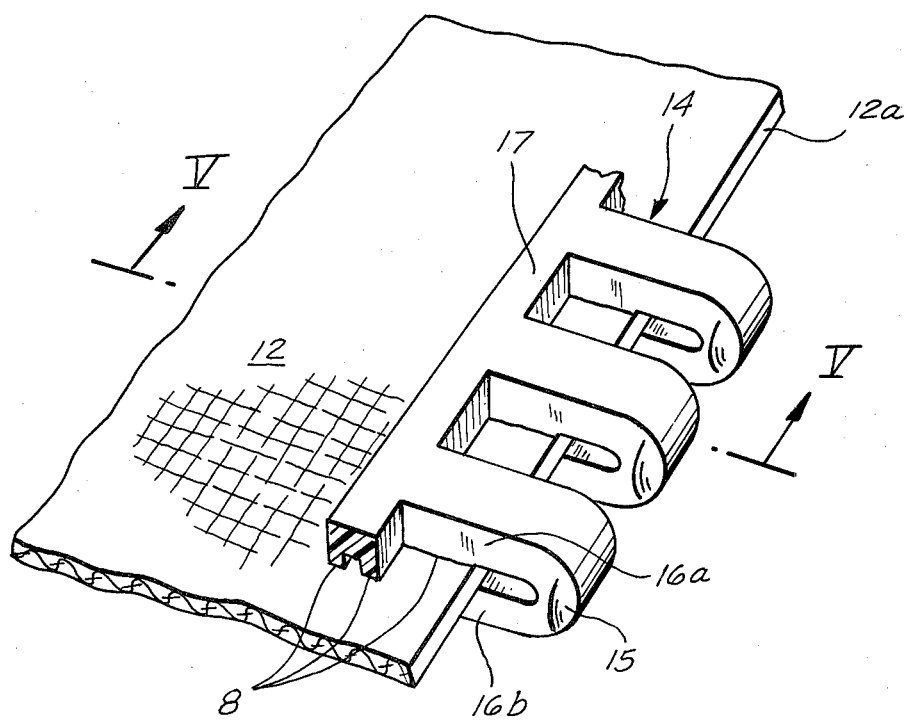
FIG. 4 is a view similar to FIG. 1 of an embodiment of the invention in which each coupling member has a U-configuration and straddles the edge of a support tape.

FIGS. 4 and 5 illustrate an embodiment of the invention in which, after the two shanks 16a and 16b of the coupling members 14 have been formed on opposite sides of a head portion 15 in a mold of the type illustrated in FIG. 3 (i.e., unitarily with the ligatures or connecting portions 17, the welding humps 18 are formed as previously described by embossing and the coupling element is folded around the edge 12a of a tape 12 so that the heads 15 are formed by bights 13 of the U-shaped coupling members thereby formed. As a consequence, each coupling member is linked to the adjoining coupling members by ligatures 17 flanking opposite sides of the tape 12, each coupling head 14 has a pair of shanks 16a and 16b straddling the edge 12a, and the entire coupling element receives this edge of the tape. When the straddling shanks or legs are pressed toward one another, they clamp the tape between them and can be thermally welded to the tape in the manner described. The portions of the connecting ligatures 17 and the shanks 16a, 16b confronting the tape 12 are formed with the welding humps by embossment so that the welding humps lie along the edges of these surfaces, i.e., the embossing tools, and a secure anchorage is obtained for the reason previously described. The method of mounting and making these coupling elements (FIGS. 4 and 5) and an apparatus for this purpose are described in greater detail in the aforementioned patent application.

I claim:

1. A slide fastener stringer half comprising a textile support tape and a coupling element along an edge of said tape, said coupling element comprising a multiplicity of spaced coupling members each having a coupling head adapted to interdigitate with the coupling heads of a similar coupling element on a mating stringer half, and at least one fastening portion unitarily with said head and secured to said tape, said coupling element being further provided with a connecting portion between each coupling member and adjoining coupling members, at least one of said portions being provided with an annular planar surface confronting said tape and formed with a multiplicity of humps in a surface array welded to said tape.

2. A slide fastener stringer half as defined in claim 1 wherein said one of said portions is said connecting portion.

3. A slide fastener stringer half as defined in claim 1 wherein said one of said portions is said fastening portion of each coupling member.

4. A slide fastener stringer half as defined in claim 1 wherein all of said portions are formed with said humps.

5. A slide fastener stringer half as defined in claim 1 wherein said humps are formed along edges of said surface of said one of said portions of each coupling member.

6. A slide fastener stringer half as defined in claim 1 wherein said coupling members lie along one surface only of said tape.

7. A slide fastener stringer half as defined in claim 1 wherein said coupling members straddle said tape and each has a pair of shanks form fitting around an edge of the tape, said shanks forming said fastening portion and being provided with said humps.

8. A slide fastener stringer half as defined in claim 1 wherein said surface of said one of said portions of each coupling member is provided with a recess corresponding to displacement of thermoplastic material to form said hump around said recess.

* * * * *